Dec. 9, 1924.
P. S. ARNOLD
1,518,239
GEAR TOOTH ROUNDING MACHINE
Filed April 2, 1920  4 Sheets-Sheet 2
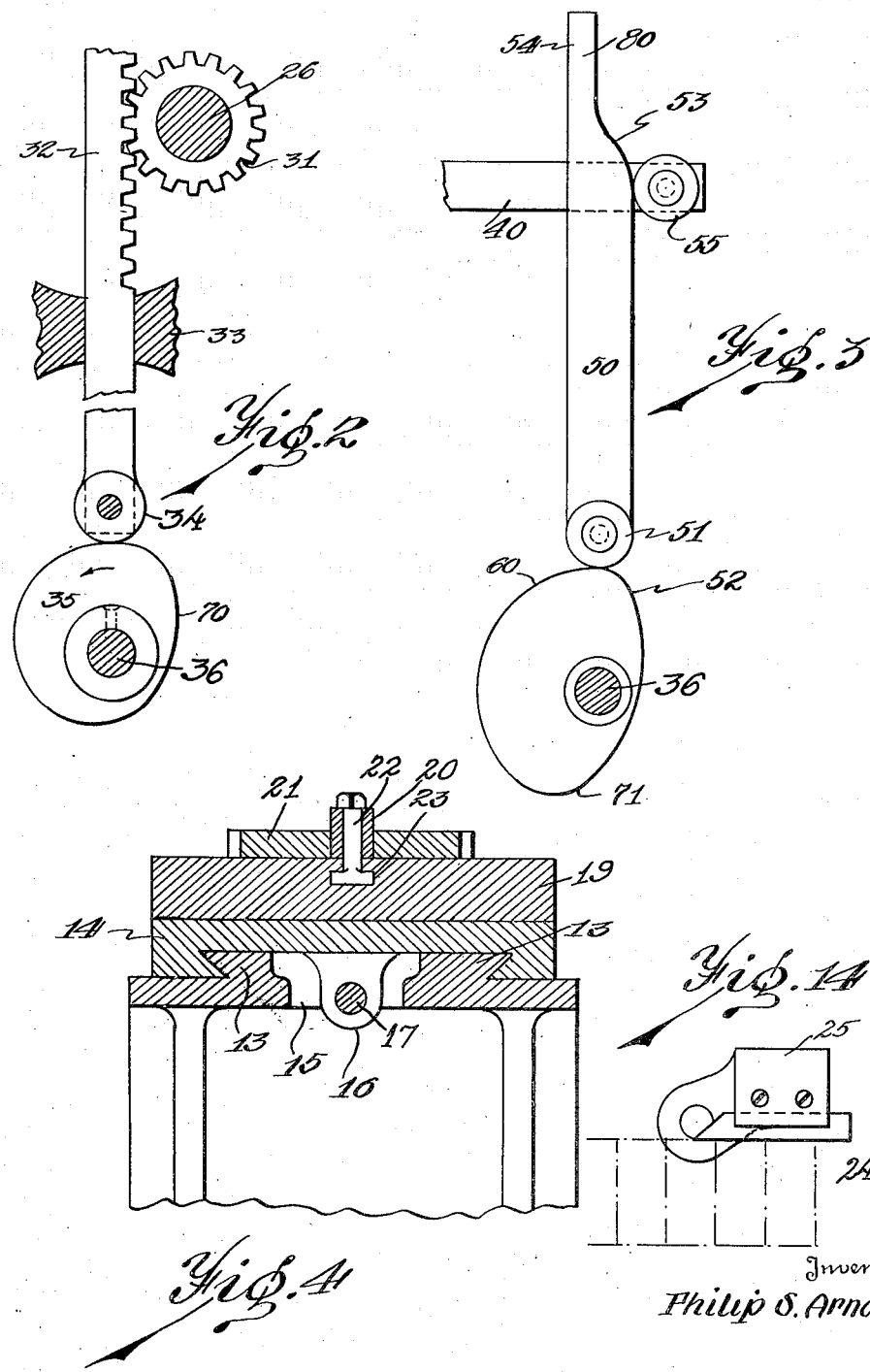
Inventor
Philip S. Arnold
By Charles E. Wiener
Attorney

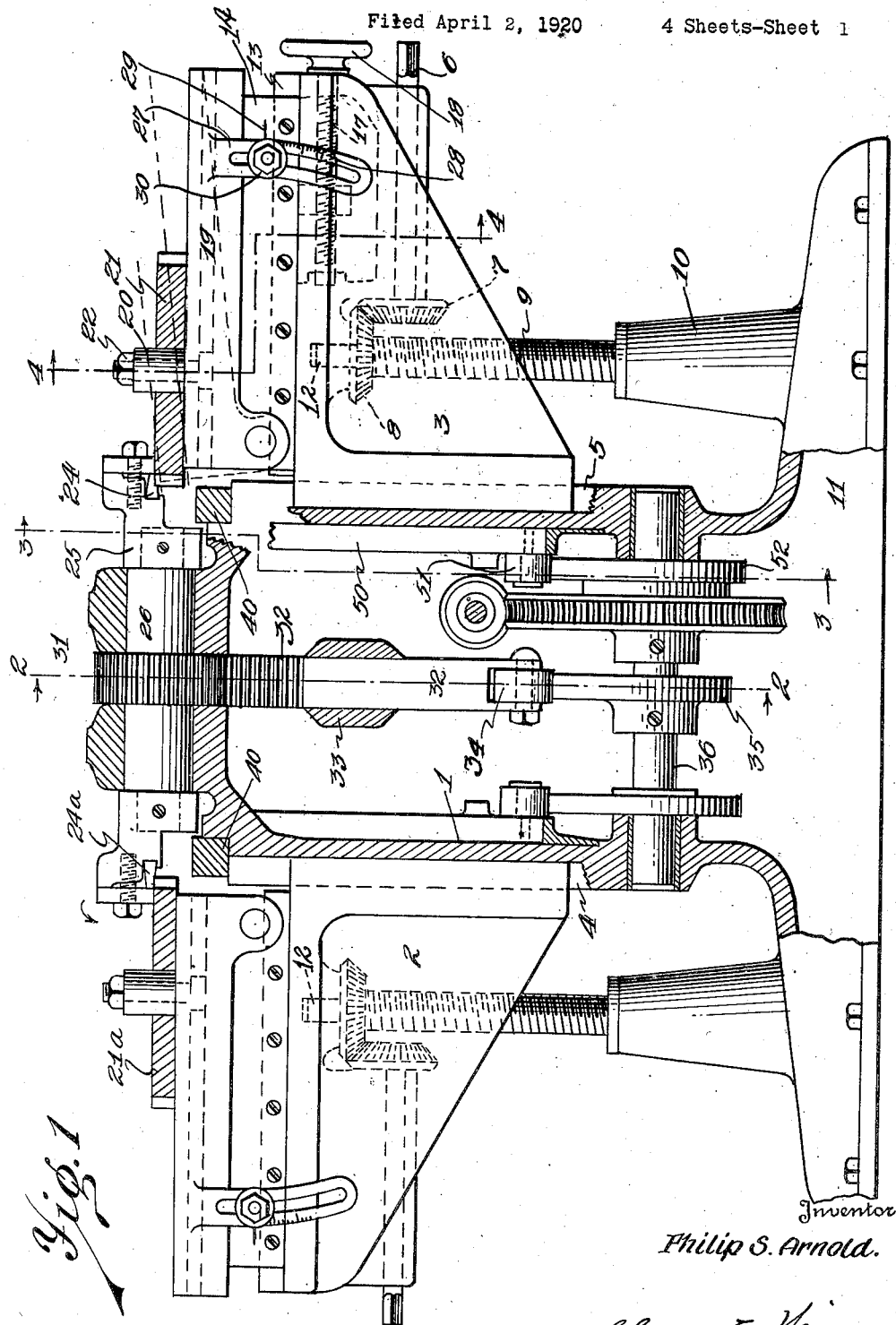

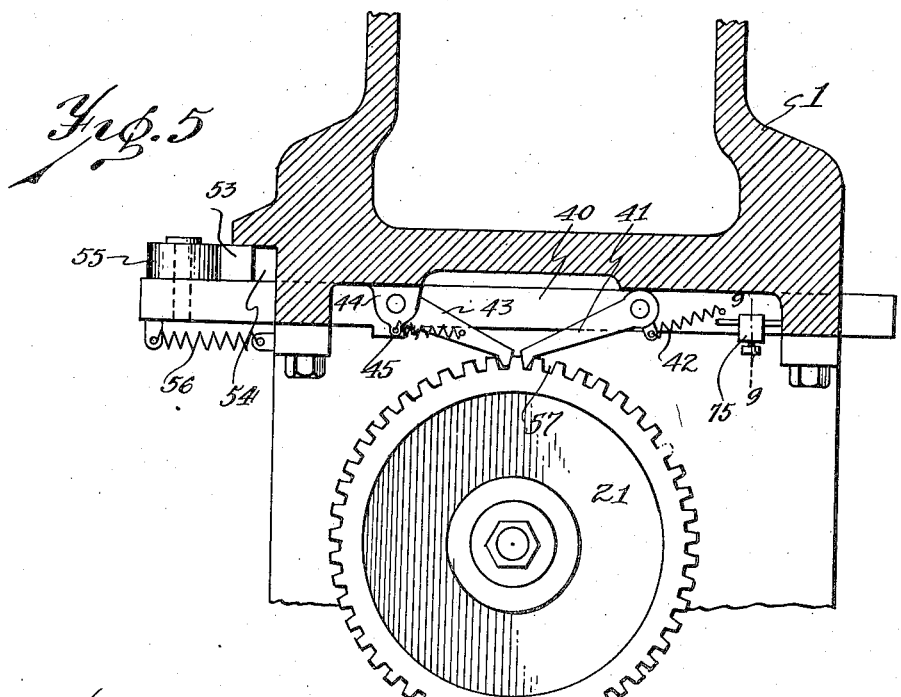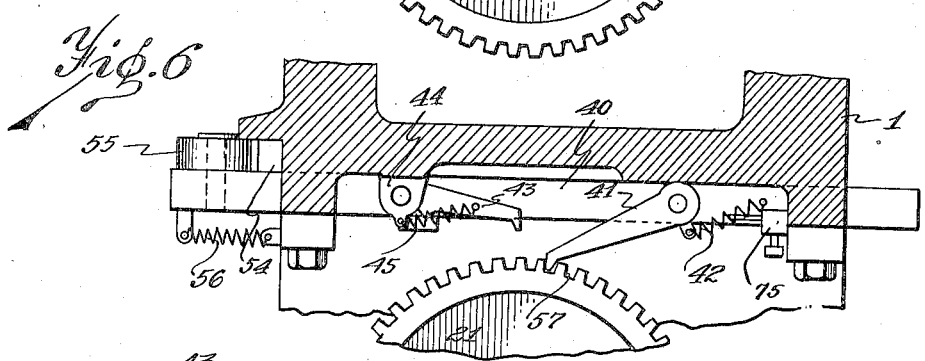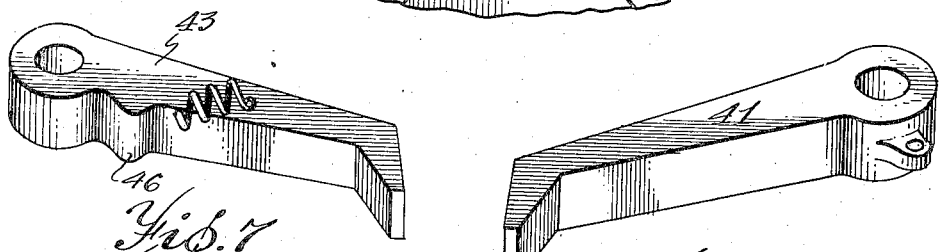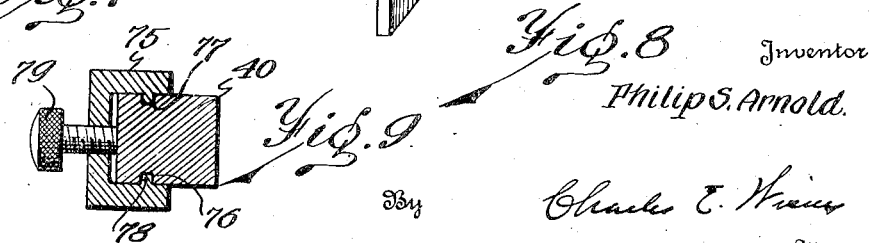

Patented Dec. 9, 1924.

1,518,239

UNITED STATES PATENT OFFICE.

PHILIP S. ARNOLD, OF HIGHLAND PARK, MICHIGAN, ASSIGNOR TO MILTON O. CROSS, OF DETROIT, MICHIGAN.

GEAR-TOOTH-ROUNDING MACHINE.

Application filed April 2, 1920. Serial No. 370,857.

*To all whom it may concern:*

Be it known that I, PHILIP S. ARNOLD, a citizen of the United States, residing at Highland Park, county of Wayne, State of Michigan, have invented a certain new and useful Improvement in Gear-Tooth-Rounding Machines, and declare the following to be a full, clear, and exact description of the same, such as will enable others skilled in the art to which it pertains to make and use the same, reference being had to the accompanying drawings, which form a part of this specification.

This invention relates to gear tooth rounding machines, and its object is to provide a simple and efficient mechanism for rounding the ends of the teeth of spur gears for use in sliding gear transmission of automotive vehicles where the gears are moved on their longitudinal axes into mesh one with the other. The principal object of this invention is to provide a cutter of a chisel like form, the cutting edge of which is moved in a semi-circular path to shear or plane the tooth end on one side at a single stroke, the gear being held stationary during the cutting operation. A further feature of the invention is to provide two shearing cutters of the character stated simultaneously operable and each operating upon a gear tooth of the respective gear. The construction and arrangement of the cutters and the gears is such that each cutter operates on one side only of the end of a gear tooth cutting substantially from an axial line passing centrally through the tooth between the sides thereof and cutting out through one side thereof on a circular path. As the two cutters are turned in the same direction one cutting on the left hand side of a gear tooth and the other on the right hand side, the gear that is first cut by one cutter, after the finishing of the cutting operations on the several teeth, may be placed in position to be operated upon by the other cutter which completes the rounding of the end of the tooth. An additional object of this invention is to provide a machine having a plurality of cutters as described to increase the output of the machine and thus lessening the cost of operation. A further object of the invention is to provide means for holding a gear in fixed axial position relative to the cutter and means for indexing the gear by turning it on its axis during the recovery of the cutter for a subsequent operation and to fixedly hold the gear during the cutting period. Another object of this invention is to provide a shearing tool or cutter oscillatable through an arc about the end of a gear tooth and means for varying the position of the gear whereby the end of the tooth may be made to occupy a plane at an angle to the horizontal permitting the tooth to be rounded on an axis at an angle to the plane of the said end of the tooth thus causing the rounded tooth to slope inwardly from the side of the gear. Other novel features of the invention are found in the mechanism for operating the cutters and in the mechanism for regulating the indexing device for indexing gears having teeth of various sizes. These and other objects and novel features of the invention are hereinafter more fully described and claimed and the preferred form of construction embodying the invention is shown in the accompanying drawings in which—

Fig. 1 is a vertical section of a gear tooth rounding machine embodying my invention showing the principal operating parts of the machine.

Fig. 2 is a detail showing the cam and gear and rack for oscillating the cutters.

Fig. 3 is a detail of the mechanism for actuating the indexing fingers.

Fig. 4 is a section taken through the supporting table for the gear on line 4—4 of Fig. 1.

Fig. 5 is a detail in plan view showing a gear and indexing mechanism in the position for holding the gear rigid during the cutting operation.

Fig. 6 is a similar view showing the indexing mechanism when set in position to index the gear.

Fig. 7 is a detail in perspective of one of the indexing fingers.

Fig. 8 is a detail in perspective of the other of the indexing fingers.

Fig. 9 is a section taken on line 9—9 of Fig. 5 showing in detail the means used to vary the extent of movement of the indexing bar.

Fig. 14 is a front elevation of the cutter and holder.

Figure 10:
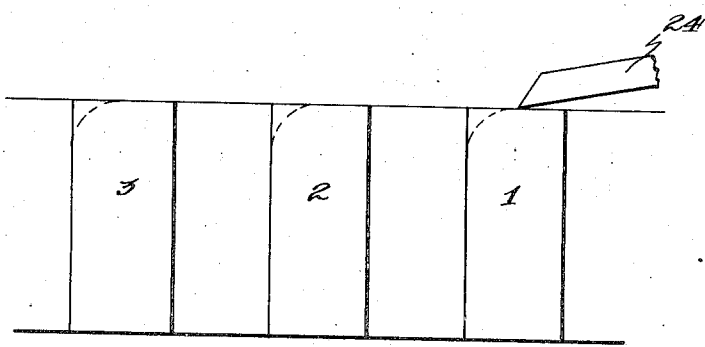
Figs. 10, 11, 12 and 13 are diagrammatic views showing the operation of the cutter and the indexing of the gear relative to the cutter movement.

The machine in its preferred form consists of a central frame member 1 on opposite vertical sides of which are provided the tables 2 and 3 riding in vertical ways 4 and 5 respectively on the said sides of the frame. These tables are independently controlled by means of a shaft 6 in each case having a gear 7 thereon meshing with the bevel gear 8 on the vertical screw shaft 9 threaded in a box 10 supported or provided on the base 11 of the frame 1. The shaft 6 and the upper end 12 of the screw shaft are supported in bearings provided in each table therefor and rotation of either shaft 6 in one direction or the other raises or lowers the respective table.

The tables are alike as shown and each has provided on the upper end thereof ways 13 and a block 14. As will be understood from Fig. 4, the table at the upper end has a slot 15 therein between the ways 13 in which a lug 16 from the member 14 depends. This lug is threaded to receive a screw shaft 17 provided at the outer end with a hand wheel 18 and by rotation of the hand wheel and shaft the block 14 may be moved on the ways 13 provided therefor. To this block 14 in each case is pivotally supported at the forward end the block 19 having thereon a spindle 20 for centrally supporting the gear 21 to be operated on. The spindle 20 is held by a bolt 22 having a head positioned in a T slot 23 therefor provided in the block 19 whereby the spindle may be set in different positions as required to receive gears of various diameters and position the same relative to the cutting tool 24. The gear is roughly positioned by means of the spindle 20 and bolt 22 and by means of the screw shaft 17 is brought to accurate position relative to the tool and indexing mechanism for the gear hereinafter described.

Each tool 24 is carried in a holder 25 as will be understood from Figs. 1 and 14, and the two tools are attached to opposite ends respectively of an oscillatible shaft 26 carried in bearings provided at the upper end of the central framework 1. It is to be noted that the cutting end of the tool 24 is of chisel like form and is so positioned relative to the center of oscillation of the shaft 26 as to cut about the end of the gear tooth on one side only, the extended center of oscillation passing through the tooth preferably substantially equidistantly from opposite sides thereof as will be understood from Fig. 10. By means of an indexing mechanism hereinafter described the tooth may be presented to the tool in such manner that the axis of oscillation of the tool passes nearer to one side of the tooth than the other which is desirable in some cases and with this character of tool the material is cut from the tooth at one stroke of the tool which cuts the corner therefrom rounding one side of the tooth at one end and the plane of movement of the tool is at a right angle to the plane occupied by the gear when the gear is in horizontal position as shown in Fig. 1. Preferably, the tool is of such shape that the tooth is cut back at the periphery to a greater extent than at the point of connection with the body of the gear so that the end of the tooth occupies a plane at an angle to the side of the gear and this may be increased or decreased by tilting of the holder or block 19 for the gear which may be set at various angles to the horizontal as indicated by dotted lines at the right side of Fig. 1. A convenient means for tilting the table or holder 19 is by means of a slotted arcuate plate 27 attached to the member 19 and having graduation marks 28 on one side which by reading in relation to a mark 29 on the member 14 determining the angle at which the block 19 and consequently the face of the gear 21 is held. A screw member 30 is provided extending through the arcuate slot of the member 27 by means of which it is secured in place. Other mechanism, however, for adjusting the angular relationship of the members 19 and 14 may be employed if desired.

As before stated, the tool is of the type used in a planer and is chisel like in form being moved about the end of the gear tooth on an axis passing through the gear tooth adjacent one end. Evidently the mechanism must be of sufficient strength to permit the shaving or cutting of the material at one stroke of the cutter and, for this purpose, I have provided the cutter shaft 26 with a gear 31 with which meshes a rack 32 movable vertically in the frame member 1 which is provided with a support 33 for the rack formed in the casting. The rack at the lower end is provided with a roller 34 riding on a cam 35 attached to the driving shaft 36 extending in parallel relation with the gear shaft 26. This cam 35 is shown more particularly in Fig. 2 and turns in the direction shown by the arrow in said figure. The shape of the cam is such as to gradually raise the rack 32 to the full extent and thereupon to permit the rack to fall rapidly to original position whereby a quick return of the tool is secured. As the tool is freed from the work, upon completion of its cutting movement, the rack will return to normal position by gravity and return the tool to position for a succeeding cut on a succeeding tooth by reason of the operative relationship of the indexing mechanism hereinafter described.

As heretofore stated there are two cutting tools each operating upon a gear at the same interval, there being one gear 21 on one side of the machine and a gear 21ª upon the opposite side of the machine positioned for operation by the respective cutters. It is to be noted, however, that the tool in operating on the gear 21 cuts only the left hand side of the end of the gear tooth and, while the cutter 24ª is in such position that the cutter 24ª rounds the right hand corner of the end of a gear tooth and thus a gear to completely round the end of the tooth must be operated upon by both cutters in the manner here stated. In operating upon a gear the said gear is first placed upon one of the spindles 20 where one side of the end of each gear tooth is rounded and this gear is then placed upon the opposite side for operation by the cutter 24ª and a new gear placed upon the spindle 20 at the right side of the machine. Thus at each oscillation of the shaft 26 and cutting tools the work completed is equivalent to the rounding completely of the end of one tooth and the output of the machine is thus increased in that in effect a complete rounding of the end of the tooth is occasioned by an oscillation of the cutters through substantially one-fourth of an arc of a circle.

The indexing mechanism is shown in Figs. 5 to 13. As shown in Fig. 5 this mechanism consists of a bar 40 reciprocable in bearings on ways provided at the upper end of the frame 1 on each side beneath each cutter. The reciprocation of the bar 40 is transversely of the axis of oscillation of the shaft 26. On this bar 40 is a pawl 41 provided with a spring 42 tending to hold the same outward into engagement with the teeth of the gear 21 shown in relation thereto in Fig. 5. The forward end of the pawl is shaped to correspond to the shape of the side of a gear tooth and by movement to the left of Fig. 5 will turn the gear by reason of the engagement of the said end with a side of the tooth. The pawl end is further shaped so that on movement to the right of Fig. 5 the pawl end will draw out from between the teeth and drop into the space between succeeding teeth. A second pawl 43 is provided pivoted to an ear 44 secured to the head of the frame 1 and thus the pawl 43 is stationarily pivoted relative to the bar 40 while the pawl 41 is pivoted directly on the bar 40 and moves with it. The bar has an upwardly extending lug 45 thereon which rides along the gear side of the pawl 43 during movement of the rod 40. The pawl 43 is provided with a cam like projection 46 that is adapted to be engaged by this lug 45 on movement of the rod 40 to the right of the position shown in Fig. 5 and the contact of this lug 45 with the cam like projection 46 of the pawl 43 raises the pawl 43 from engagement with the gear. As the pawl 43 is stationarily pivoted the end of the pawl 43 remains in engagement between the teeth of the gear while the pawl 41 is drawing out of engagement therewith but just as the pawl 41 draws out of engagement between the teeth of the gear the pawl 43 is raised. On completion of movement of the rod 40 to the right of Fig. 5 the pawl 41 will drop into position between the next succeeding teeth of the gear while the pawl 43 is still held out of engagement therewith by reason of the lug 45 riding along the face of the pawl. Then, on movement to the left occasioned by mechanism next described, the pawl 41 turns the gear on its spindle and, as the lug 45 rides out from under the cam 46, the end of the pawl 43 drops into place. The relationship of mechanism is such that, after the pawl 43 drops into place, the cutting tool is operated to cut upon the tooth held between the opposed ends of the pawls 41 and 43 and the gear is thus rigidly held in position during this cutting operation. These pawls 41 and 43 are below and out of the path of movement of the cutters.

Figure 11:
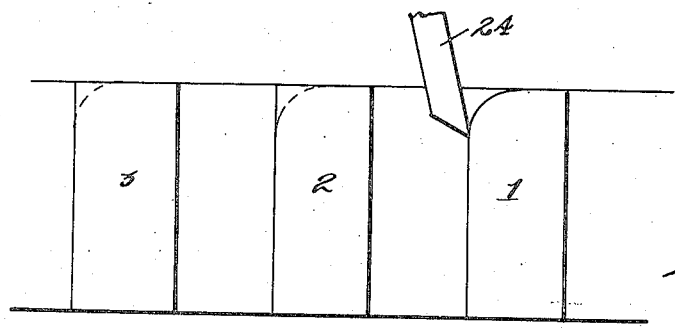
Figure 12:
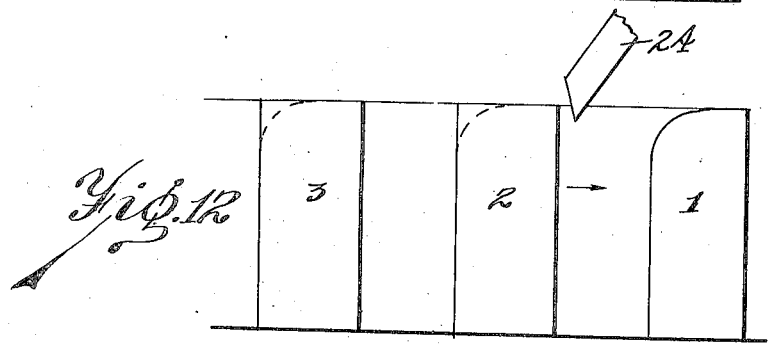
Figure 13:
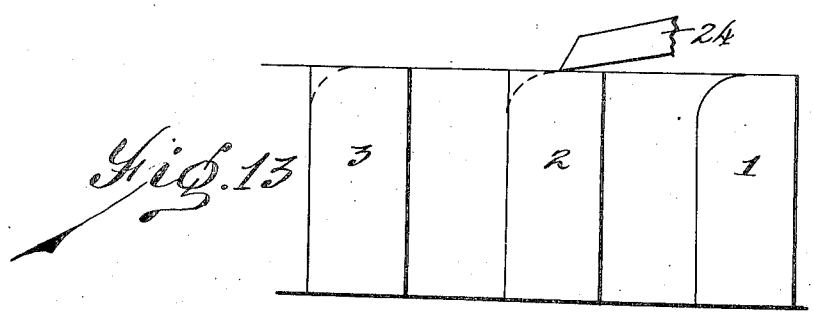

The bar 40 is reciprocated by means of what I have termed a cam bar 50, there being such a bar for each side of the machine as will be understood from the drawing. This bar is provided with a roller 51 at the lower end riding on the cam 52 provided therefor on the shaft 36. The upper end of the bar 50 is formed with an angular cam face 53 and the bar terminates in a comparatively narrow portion 54, which, when the bar 40 is at the right of the position shown in Fig. 5, is engaged by the roller 55 provided on the end of the bar 40. A spring 56 of considerable tension is provided tending to move the bar 40 to the right of the position shown in Fig. 1 and thus hold the roller continuously in engagement with the side of the cam bar 50. Thus, when the roller is at the right of the position in Fig. 5 with the pawl 41 dropping into position between the teeth in the space indicated at 57, the roller is practically in contact with this portion 54 of the cam bar. As is shown in Fig. 3 the cam 52 on which the roller 51 rides is shaped to cause an upward movement of the bar 50 and consequent movement of the bar 40 to turn the gear during the time the rack 32 is moving downward on its cam whereby the reciprocation of the rod 40 and the consequent indexing of the gear takes place during the period of the return movement of the cutters caused by downward movement of the rack 32. The cam 52 for the cam bar 50 has a portion 60 practically a true circle which holds the cam bar with the widest portion engaged by the roller 55 of the bar 40, and this position is maintained during the cutting operation caused by the upward movement of the rack 32. By this relationship of the operation of the cutters and indexing mechanism the gear is turned forward to bring a succeeding tooth to position for operation as the tool retreats to original position. This is graphically illustrated in the diagrams Figs. 10 to 13. In Fig. 10 the tool 24 for instance, is in the position at the beginning of a cut which is to be taken along the dotted lines shown in Fig. 10 on the tooth 1. In Fig. 11 the completion of this movement of the cutting tool is shown, the gear having been held stationarily in position as will be understood by the relative position of the tooth 1 of Fig. 10 and the same tooth directly therebeneath in Fig. 11. On the completion of this movement of the cutter, as before described, the indexing mechanism starts to operate turning the tooth 1 to the right as shown by the arrow in Fig. 12 and during movement of the tool 24 in the direction shown by the arrow in the said figure, so that upon completion of the return movement of the cutters the tooth 2 of the gear will occupy the position relative to the tool that was originally occupied by the tooth 1 as is indicated in Fig. 13 whereupon the cutter is again operated.

It is therefore to be seen and understood that the gear is held rigidly by the pawls 41 and 43 during the period the cutting tool is operating and at the finish of the cutting movement is positioned between the two adjacent teeth as shown in Fig. 11. After the cutting tool begins to retreat to assume its original position the gear is moved at a speed corresponding to the speed of movement of the tool and as the tool is raised from between the adjacent teeth from the position shown in Fig. 12 to the position shown in Fig. 13 the next succeeding tooth is brought to cutting position. The speed of rotation of the gear in the indexing movement is determined by the shape of the cam 52 and cam face 53 of the bar 50 so that the speed of movement of the bar 40 moves the gear at the same speed practically as the movement of the cutter in retreating. The position of the cam 35 shown in Fig. 2 is practically the position of the parts at the finish of the cutting operation of the tool and the face 70 of the said cam is shaped to permit a fairly quick movement of the tool in returning to original position. The face 71 of the cam 52 is the portion traversed by the roller 51 in raising the cam bar 50 to move the bar 40 to index the gear during the time the portion 70 of the cam 35 permits the retreating movement of the cutter, the relationship of the two cams being approximately shown in Figs. 2 and 3.

By changing the angle of the face 53 of the bar 50 a more or less rapid movement of the bar 40 is occasioned by the cam 52. However, to permit the same bar 50 to be utilized in the indexing of the gears of various sizes of teeth I have provided an adjustable stop device 75 carried on the rod 40 which is provided with grooves 76 and 77 in opposite faces engaged by ribs 78 on the part 75. This stop 75 is substantially U shaped in form and is provided with a binding screw 79 to fix the same in position. This stop as will be understood from Fig. 5, determines the extent of movement of the bar 40 under action of its spring 56 and thus the bar 40 when released to action by its spring by withdrawal of the bar 50 may move to the right only the distance permitted by this stop 75. Thus the roller 55 may stop short of contact with the face 80 at the end 54 of the bar 50 and thus on movement of the bar 50 upward the roller 55 will not be actuated until a portion of the angular face 53 has passed above the adjacent face of the roller 55. Movement of the bar 40 may thus be delayed and the extent of its movement from one position to the other decreased and thereby permitting a greater or less length of movement of the bar 40 as may be determined by the distance between the centers of the teeth of the gear to be operated upon. By this arrangement described of the stop device, a bar 50 having a face 53 of a specific angle and cam 52 of a specific actuating face 71 may be utilized with gears of considerable difference in distance between centers of teeth and the indexing mechanism is therefore adapted for use with a great variety of gears.

To recapitulate, the several objects of the invention as is evidenced from the above description are secured by the construction described herein or equivalent mechanism and thus a gear tooth rounding device is provided in which the gear is axially fixed relative to the tool and is indexed by turning about the fixed axis during the idle movement of the tool in retreating for a succeeding operation and is indexed or turned at a peripheral speed corresponding to the speed of retreat of the tool and thus no loss of time is occasioned as is usual in devices of this character where the indexing interval occurs subsequent to the retreat of the tool to its original cutting position. Further, by operating upon two gears at the same time one cutter operating upon the end of the tooth on one side and the other cutter operating upon the other side, the end of a tooth is completely rounded in a turn of the cutting tool through an arc of practically ninety degrees and thus a tooth is both rounded and indexed within the period of time required for the cutting tool to traverse an arc of one hundred and eighty degrees and the saving in time on this machine is equal to that required in other devices to index the gear.

It is further to be observed that the mechanism is simple, inexpensive in construction and efficient in operation.

Having thus fully described my invention, what I claim and desire to secure by Letters Patent of the United States is—

1. The method of rounding the ends of gear teeth which consists in first shearing the side of one end of each tooth successively on an arc of substantially ninety degrees of a circle and then successively submitting the opposite side of the ends of the teeth to a second and similar shearing operation.

2. In a machine for rounding the end of a gear tooth, a cutter of chisel like form, means for oscillating the cutter, means for positioning the gear with the end of a tooth in such position that the cutter shears the same from the center of the said end to the side on an arc of substantially ninety degrees of a circle, and means for fixedly holding the gear during the cutting operation.

3. In a machine for rounding the end of a gear tooth, a shearing cutter oscillatable through an arc substantially of ninety degrees of a circle, means for positioning the gear with a tooth thereof in such relation that a side of one end of the tooth is sheared or cut on an arc, means for holding the gear stationary during the cutting operation, and means for indexing the gear on the return movement of the cutter.

4. In a machine for rounding the ends of gear teeth, a shearing cutter adapted to be oscillated through an arc, means for positioning a gear with a tooth thereof in the path of movement of the tool to shear one side of an end of a tooth, and a second cutter simultaneously operable with the first cutter adapted to operate upon the opposite side of a tooth of a gear to complete the rounding of the tooth ends.

5. In a machine for rounding the ends of gear teeth, a cutting tool of chisel like form and operation adapted to be turned through an arc, mechanism for holding a gear with the tooth thereof in such position that the axis of movement of the tool passes through the tooth substantially equidistantly between the sides, and means for turning the tool to shear the side of one end of the tooth on an arc.

6. In a machine for rounding the ends of a gear tooth, a cutting tool of chisel like form and operation adapted to be turned through an arc of a circle, mechanism for holding a gear with the end of the tooth thereof in such position that a radial line passing through the tooth equidistantly between sides thereof coincides with the axis of movement of the tool, means for turning the tool to shear the side of one end of the tooth, said means being adapted to return the tool for a subsequent operation, and means for indexing the gear during the return movement of the tool.

7. In a machine for rounding the ends of gear teeth, a cutting tool of chisel like form adapted to be oscillated through an arc of a circle, mechanism for holding a gear with the end of a tooth thereof in such position that the extended axis of oscillation of the tool passes through the tooth adjacent one end, an oscillatable shaft for holding the cutter, a second cutter oppositely disposed relative to the first cutter and turning in the same direction in the cutting operation, and means for holding a second gear in the same relative position to the second cutter as the first gear is to the first cutter whereby the oscillation of the shaft cuts one side of the end of the tooth on one gear and the opposite side of the end of the tooth of the other gear, and means for indexing the gears to bring succeeding teeth to position for a subsequent operation.

8. In a machine for rounding the ends of gear teeth, a cutting tool of chisel like form adapted to be oscillated through an arc of substantially ninety degrees, means for positioning a gear with the end of a tooth thereof in position whereby the cutting movement of the cutter shears one side of the end of the tooth on the desired radius, and a second cutter simultaneously operable with the first cutter operating upon the opposite side of a tooth of a second gear positioned in similar relation thereto as the first gear relative to its cutter.

9. In a machine for rounding the ends of gear teeth, a pair of cutting tools, a shaft, the tools being secured to opposite ends of the shaft and both facing in the same direction, means for oscillating the shaft through an arc substantially of ninety degrees, and means for positioning a gear relative to each tool at opposite ends of the shaft whereby the teeth of the two gears are operated upon simultaneously, and indexing mechanism for each gear adapted to index the same during the idle movement of the cutters.

10. In a machine for rounding the ends of gear teeth, a cutting tool of chisel like form adapted to be oscillated in a vertical plane through an arc of substantially ninety degrees, means for positioning a gear with a tooth thereof in such relation that the extended axis of oscillation passes through the tooth adjacent the end thereof substantially centrally between opposite sides, means for holding the gear stationary during the cutting operation, and means for positioning the gear with the ends of the teeth in a plane at an angle to the axis of oscillation of the cutter.

11. In a gear-tooth rounding machine, an oscillatable cutter of chisel like form adapted to be turned in a vertical plane through an arc of substantially ninety degrees, means for positioning a gear relative thereto in axially fixed relation, means for positioning the side of the gear and end of the tooth to be operated upon in planes at various angles to the plane of movement of the tool with the extended axis of oscillation passing through the tooth to be operated upon adjacent one end, and means for turning the gear on its axis to index the same.

12. In a machine for rounding the ends of gear teeth, a cutting tool of chisel like form adapted to be turned about an axis, means for positioning a gear with the face thereof parallel to the plane of movement of the tool, means for turning the tool through an arc of substantially ninety degrees, the tool passing from position substantially parallel with the plane of the end of the tooth to a position substantially parallel with the side of the tooth and between adjacent teeth, and means for indexing the gear during the return of the tool to original position and thereby positioning the adjacent tooth for the cutting operation.

13. In a machine for rounding the ends of gear teeth, a cutting tool adapted to turn about an axis to shear the side of an end of a tooth on an arc substantially of ninety degrees, an adjustable table for the gear to position the same with a tooth thereof in such position that the axis of oscillation of the tool passes through the tooth adjacent one end, a holder for the tool of a character to maintain the same in axially fixed relation to the tool, means for varying the angle of the side of the gear relative to the plane of oscillation of the tool, and an indexing mechanism for turning the gear subsequent to each cutting operation.

14. In a machine for rounding the ends of gear teeth, a cutting tool adapted to be turned about an axis to shear the side of an end of a tooth on an arc, a second cutting tool operable in the same manner, means for positioning a gear in such relation to each cutter that the axis of oscillation of the cutter passes through a tooth substantially equidistantly between sides thereof, the teeth being cut on opposite sides by the respective cutters, a table for each of the gears, means for adjusting the table to position the gear at the proper height, an adjustable holder for each gear whereby the said gear may be positioned toward or from the tool, the said holders being further angularly adjustable relative to the plane of oscillation of the tools, and indexing mechanism for each gear operable during the idle movement of the respective tools, said indexing mechanism being of a character to hold the gear rigidly during the cutting operation and to turn the same on its axis during the indexing movement.

15. In a machine for rounding the ends of gear teeth, a shearing cutter adapted to be oscillated through an arc of substantially ninety degrees, means for positioning a gear in axially fixed relation with the cutter and with a tooth thereof in such position that the axis of oscillation of the cutter passes through the tooth adjacent one end, an indexing mechanism for indexing the gear, said mechanism comprising a reciprocable bar, a pawl pivoted thereto having an end adapted to engage between teeth of the gear, a second pawl in pivotally fixed relation to the axis of the gear and having an end adapted to engage between the teeth of the gear, the pawls being so positioned that adjacent ends thereof engage opposite sides of a tooth to hold he same during the cutting operation, means for moving the bar to position the first pawl back of a succeeding tooth adjacent the one operated on, means whereby the said movement of the bar raises the second pawl from engagement with the gear, and means for varying the extent of movement of the bar to position the first pawl whereby gears of different pitches may be operated upon, and mechanism for moving the bar in the opposite direction to turn the gear by the first pawl and substantially on completion of the movement to release the second pawl to engage the opposite side of the tooth engaged by the first pawl.

16. The method of rounding the ends of gear teeth which consists in submitting each tooth end to the operation of a shearing cutter to cut from the center of said tooth end to the side thereof and submitting the gear teeth to a second cutter of similar character to cut from the said center of the end of the gear to the opposite side to complete the rounding of the teeth.

17. The method of rounding the ends of gear teeth which consists in submitting the side of an end of each tooth in succession to the operation of a shearing cutter rounding one edge of said end on an arc and then subjecting the gear to a succeeding similar shearing operation rounding the opposite edges of the teeth in succession.

18. In a machine for rounding the end of a gear tooth, a cutter of chisel like form and operation adapted to be turned on an axis passing through the axis of the gear at an angle, means for relatively varying the angle of the axes of the gear and cutter, and means for positioning a gear with the end of a tooth in position for the cutting operation.

19. In a machine for rounding the ends of gear teeth, a cutter of chisel like form and operation adapted to be turned through an arc whose axis passes through the axis of the gear at an angle, means for turning the cutter, and means for positioning a gear with an end of a tooth for the cutting operation to round the edge on one side of the tooth end and a second cutter of practically identical operation and relationship actuated simultaneously with the first cutter adapted to cut the opposite edges of the tooth ends of a gear first submitted to the first cutter.

20. In a machine for rounding the ends of gear teeth, a pair of cutters both of chisel like form and operation adapted to be simultaneously turned in the same direction through an arc, means adjacent each cutter for supporting a gear in axially fixed relation to the respective cutters, means for holding the gear for the cutting operation, and means for simultaneously indexing the gears, the relationship of the gears and cutters being such that one of the cutters operates upon one side of the end of a gear tooth and the other cutter operates upon the respective opposite side of the gear tooth whereby in effect each operation of the cutters completely rounds a single tooth end.

In testimony whereof, I sign this specification.

PHILIP S. ARNOLD.